May 13, 1924.

M. H. SUSSMAN

CLEANING ATTACHMENT

Filed March 27, 1923

1,493,506

3 Sheets-Sheet 3

WITNESS

INVENTOR
MAXWELL H. SUSSMAN
BY
ATTORNEYS

Patented May 13, 1924.

1,493,506

UNITED STATES PATENT OFFICE.

MAXWELL H. SUSSMAN, OF NEW YORK, N. Y., ASSIGNOR TO MOHEGAN TUBE COMPANY, OF BROOKLYN, NEW YORK, A CORPORATION OF NEW YORK.

CLEANING ATTACHMENT.

Application filed March 27, 1923. Serial No. 627,971.

*To all whom it may concern:*

Be it known that I, MAXWELL H. SUSSMAN, a citizen of the United States, and a resident of Kew Gardens, borough and county of Queens, city and State of New York, have invented certain new and useful Improvements in Cleaning Attachments, of which the following is a specification.

My invention relates to cleaning attachments and has for its object to provide a mechanical attachment of novel construction and adapted to automatically and progressively clean metal elements preparatory to the welding thereof. For instance, in the manufacture of metal tubes in which the seams are welded, to which art the invention primarily relates, it is desirable to clean the surface and edges of the metal strips from which the tubes are made in order that an efficient weld may be produced. The particular purpose of my invention is to provide an attachment capable of being combined with a tubing machine and whereby the desired cleaning will be automatically performed prior to the welding operation, as the strip is being fed into the machine. Other more specific objects will appear from the description hereinafter.

Figure 1:
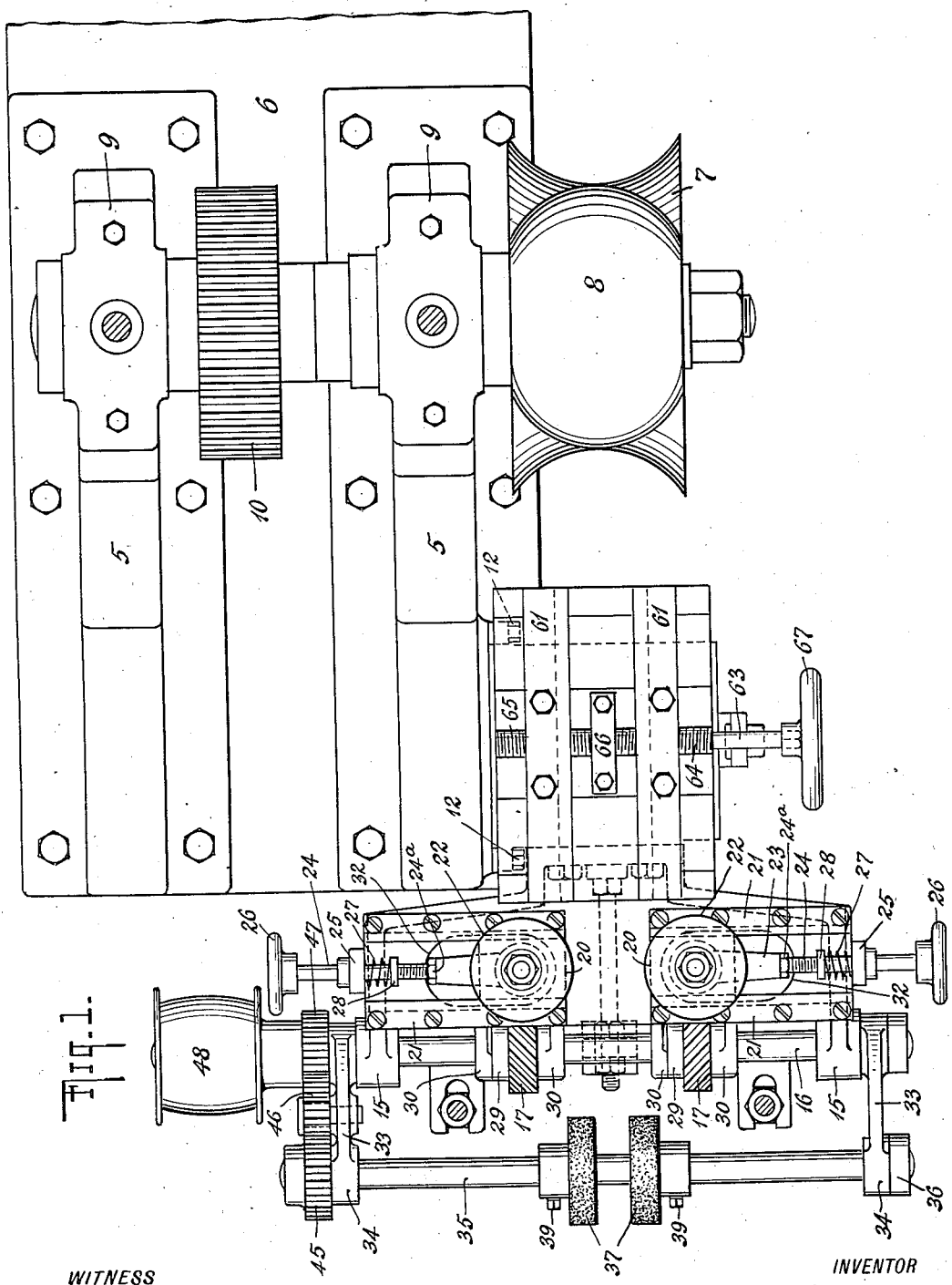
Figure 2:
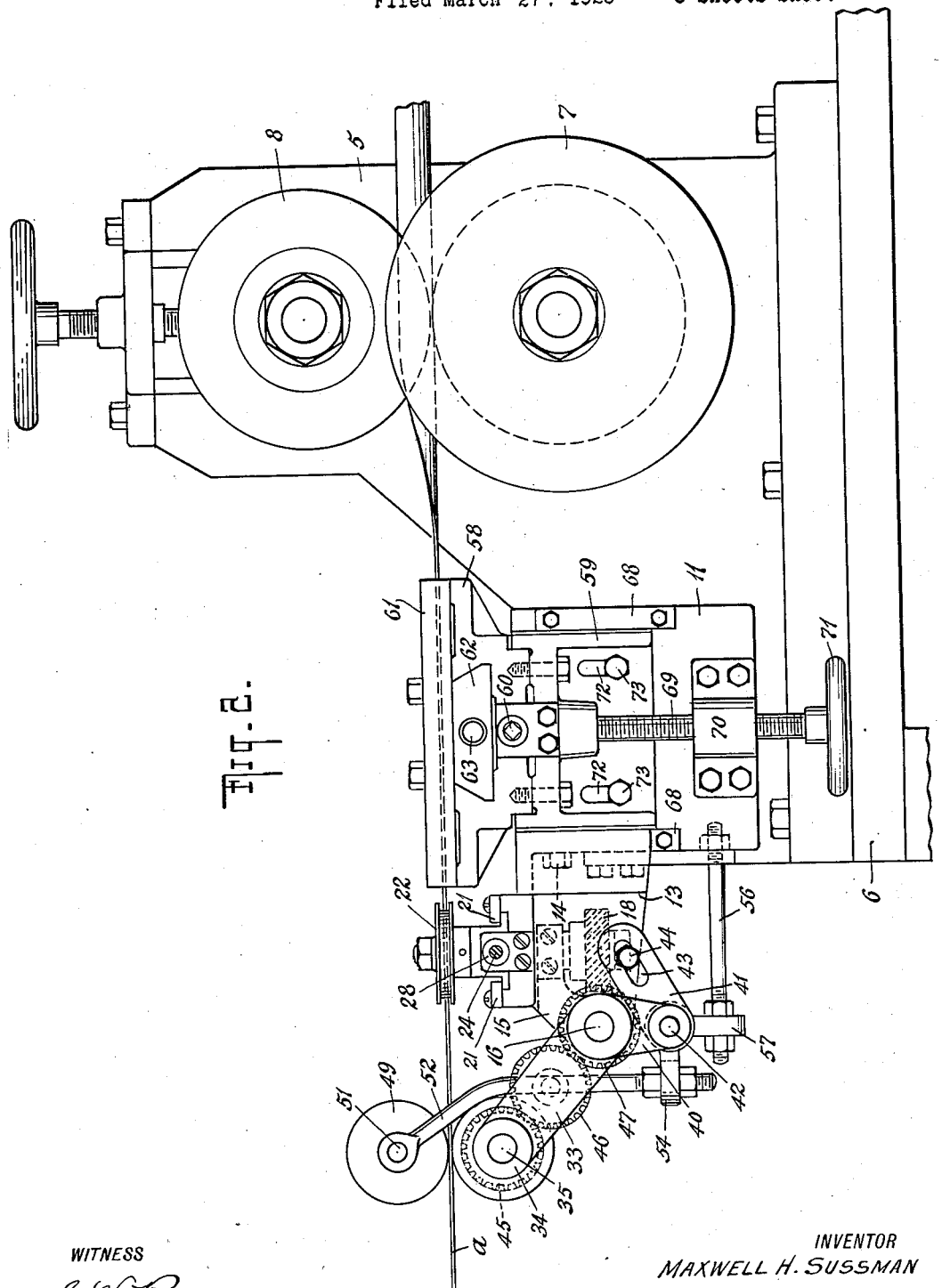
Figure 3:
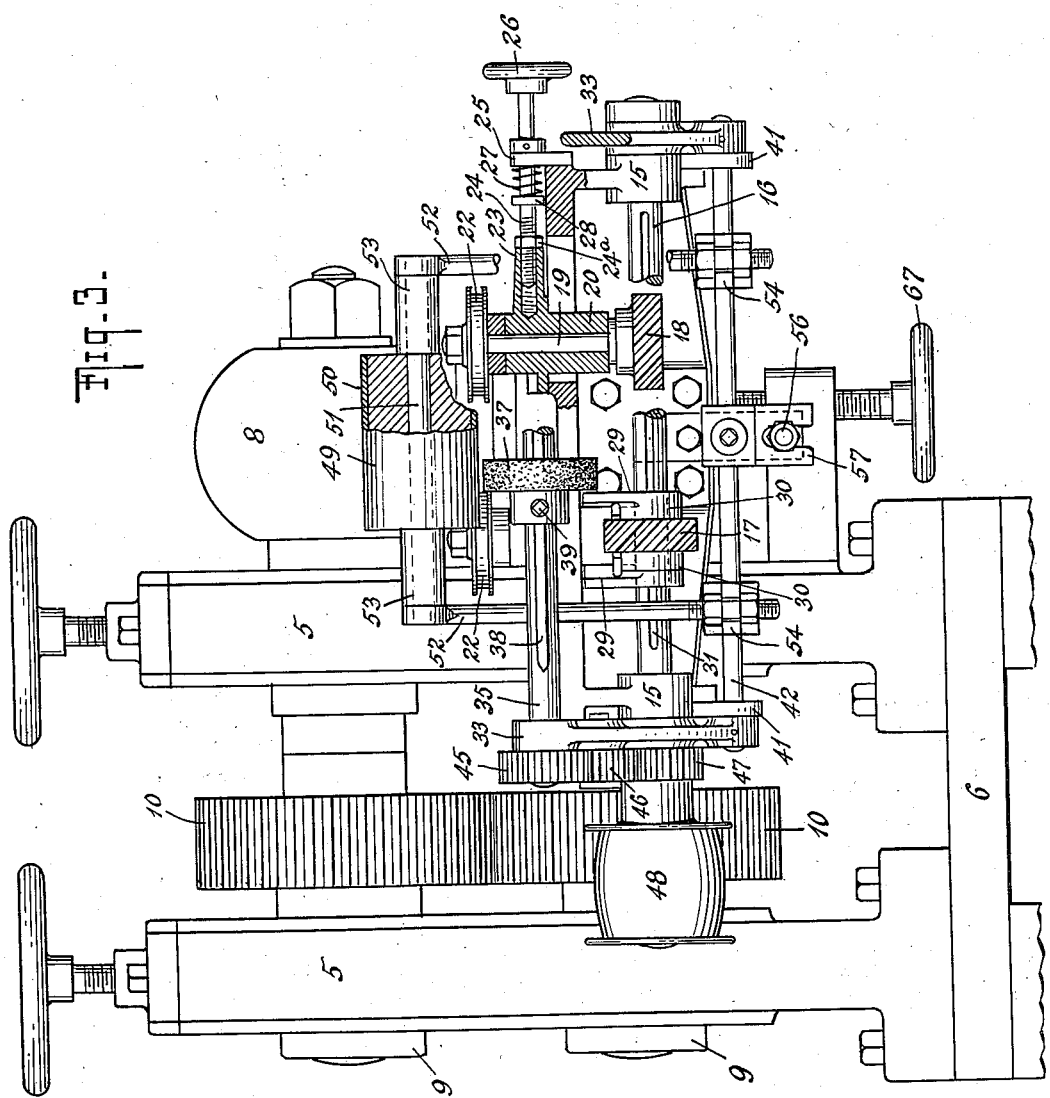

Reference is to be had to the accompanying drawings which show an example of the invention without defining its limits and in which Fig. 1 is a plan view; Fig. 2 is a side elevation and Fig. 3 is an end elevation with parts in section.

In the illustrated example the attachment is shown in operative combination with a tubing machine in which the metal strips are given the form of tubes and from which the tubes pass to the welding apparatus where the seam is welded; it will be understood that, while the invention is primarily intended for such co-operative combination it is capable of beng operatively combined with other machines and of being otherwise utilized. Only so much of the tubing machine is shown as is required to illustrate the combination, said machine being of any conventional type and comprising, for instance, a frame 5 mounted upon a support 6 and provided with suitable shaping rolls 7 and 8 whereby the metal strip is given the form of a tube. The rolls 7 and 8 are journalled in bearings 9 and are driven in any well-known way as by means of a gearing 10 connected with one of said rolls.

The tubing machine further includes the customary device for guiding the strip a in its travel toward the forming rolls 7 and 8, which device comprises a support 58 mounted upon a carrier 59 preferably so as to be adjustable thereon in directions transverse to the path of the strip a, for instance by means of an adjusting screw 60. Guide members 61 are each carried by a dove-tail block 62 slidably mounted in a correspondingly formed groove of the support 58; in order that these guide members may be coincidentally shifted toward and away from each other an adjusting screw 63 provided with right and left hand threaded sections 64 and 65 is rotatably mounted in a stationary bearing 66 so as to be held against lengthwise movement relatively thereto. The sections 64 and 65 are threaded respectively into the blocks 62 so that as the screw 63 is rotated, the members 61 will be moved toward and away from each other to vary the distance therebetween in accordance with the width of the strip a; a hand-wheel 67 may be mounted upon the screw 63 to facilitate the operation thereof.

The carrier 59 is generally slidable vertically in guides 68 upon a main bracket 11 to adjust the guide members 61 into proper operative relation with the forming rolls 7 and 8, said bracket being secured to the frame by bolts 12; the shifting of the carrier 59 is effected through the medium of an adjusting screw 69 which has its one end rotatably fixed in the support 68 and is in screw-threaded engagement with a stationary bearing 70 upon the main bracket 11. A hand-wheel 71 on the screw 69 serves to facilitate the actuation thereof; for the purpose of fixing the carrier 59 and its associated parts in an adjusted position slots 72 may be provided therein for the accommodation of bolts 73 which screw into the bracket 11 and clamp the carrier 59 in place. All of the elements so far described are well known and are simply illustrative of the mechanism with which my attachment is intended to co-operate.

The attachment comprises an auxiliary bracket 13 attached to the main bracket 11 by means of bolts 14 and provided with bearings 15 in which a shaft 16 is journalled. This shaft 16 carries spiral gears 17 which mesh with spiral gears 18 fixed upon vertical shafts 19; the latter are rotatably mounted in bearings 20 slidably mounted in guideways 21 mounted upon the auxiliary bracket 13 and projecting in opposite directions in registry with each other. The vertical shafts 19 carry flanged side rollers 22 arranged in a manner to coincidentally engage the opposite edges of the metal strip a for the purpose to be more fully pointed out hereinafter. Any suitable mechanism may be provided for adjusting the rollers 22 toward and away from each other in accordance with the width of the strip a; for instance the bearings 20 may be provided with screw-threaded members 23 for the accommodation of adjusting screws 24 which themselves are mounted in stationary members 25 in such a manner as to be freely rotatable therein. To facilitate the operation of said adjusting screws 24 they may each be provided with a hand-wheel 26, it being understood that said screws are locked in adjusted positions against movement relatively to the members 23 by lock nuts 24ª. Coil-springs 27 are located between and bear against the members 25 and collars 28 fixed upon the screws 24 and serve to yieldingly press the rollers 22 against the edges of the strip a; that is to say by the action of said springs the rollers 22 are maintained in operative engagement with said edges of the strip a regardless of slight variations in the width of the latter. In order that the operative relation of the spiral gears 17 and 18 may be maintained throughout the range of adjustment of said rollers 22, arms 29 extend from said bearings 20 and terminate in bearings 30 located in pairs upon opposite sides of each gear 17, which are capable of sliding lengthwise of the shaft 16 and are caused to rotate therewith through the medium of a spline or key 31. It will be understood that the auxiliary bracket 13 is apertured, as at 32, to permit the range of movement of the parts necessary to effect the desired adjustment of said side rollers 22. Supporting arms 33 are pivoted upon the shaft 16 and at their outer ends are provided with bearings 34 in which a shaft 35 is journalled, said shaft being fixed against lengthwise movement by collars 36 and carrying rotary brushes 37; the latter are slidably mounted upon said shaft 35 and are caused to rotate therewith by means of a key or spline 38, suitable set screws 39 being provided for fixing said brushes in adjusted positions on the shaft 35. Any convenient means may be provided for securing said arms 33 against pivotal movement on the shaft 16 and for fixing the brushes 37 in the desired position: for instance as shown said arms 33 may be provided with lugs 40 to one of which at least a link 41 is pivotally connected by means of a rod 42. The link extends over the auxiliary bracket 13 and is slotted at 43 for the accommodation of a bolt 44 which screws into the auxiliary bracket 13 and by clamping the link 41 against movement serves to lock the arms 33 in place. The shaft 35 is driven to rotate the brushes 37 by means of gears 45, 46 and 47 mounted respectively on the shaft 35, the one arm 33 and the shaft 16, the latter carrying also a belt pulley 48 or its equivalent whereby driving power is transmitted to the mechanism.

A pressure roller 49 is located above and in registry with the brushes 37 and preferably comprises a core of wood or the like covered with a jacket 50 of steel or other material. The roller 49 is carried by a shaft 51 journalled in members 52 and is centered upon said shaft by means of spacing collars or the like 53, it being understood that said roller is an idler and not postively driven although if desired means for positively actuating the same may be included. The members 52 are secured in supports 54 which themselves are fixed upon the rod 42 extending between and carried by the lugs 40; to increase and maintain the stability of the arrangement a stay bolt 56 connected with a member 57 secured upon the rod 42 and a suitable part of the main bracket 11, may be provided.

In practice the side rolls 22 are adjusted to a distance apart which is slightly less than the width of the strip a and the lock nuts 24ª are tightened against the members 23 to prevent the rollers 22 from changing their positions; with the described adjustment the peripheries of said rolls will engage the opposite edges of said strip under a slight pressure by the action of the springs 27 and said rolls will have a freedom of motion and be capable of yielding to follow said edges even if the width of said strip a varies. Either previously or at this time the attachment is properly aligned with the space between the guide members 61 which themselves have previously been properly adjusted in the well-known way. The rotary brushes 37 may be adjusted lengthwise of the shaft 35 to bring them into proper relation to the opposite edge portions of the strip a by simply loosening the set screws 39 and then tightening them again after the adjustment has been effected; to bring the brushes 37 into proper contact with the under surface of said strip a the bolt 44 is loosened to release the link 41 after which the arms 33 are shifted to any extent necessary to provide the proper relation between the brushes and the strip a after which the bolt 44 is again screwed up. The pressure roller 49 is likewise adjusted to exert the proper pressure upon said strip a by manipulating the members 52 in the supports 54.

As the mechanism is now started the strip $a$ will be fed along by the action of the rolls 7 and 8 and shaped thereby and accordingly will be drawn between the side rollers 22 and guide members 61, the latter serving to maintain said strip $a$ in its intended path. As the strip $a$ travels along the side rollers 22 will be rotated and will thoroughly clean the edges of said strip by frictional or abrasive action; at the same time the brushes 37 will be actuated and will efficiently clean the lower surface of said strip $a$ along said opposite edges. Thus by the time the strip $a$, formed into a tube by the rolls 7 and 8, reaches the welding apparatus, it is thoroughly clean and in a condition to be efficiently welded. It will be understood that the physical characteristics of the roller 22 are such as to cause them to perform their intended functions and further that the rotative speed of said rollers and the brushes 37 relatively to the speed of travel of the strip $a$ as well as their direction of rotation is so calculated as to produce the desired results.

The cleaning of the metal is effected in an automatic manner without interference with the forming of the tube or the welding of the seam and is positive and uniform, without the necessity for any continued physical labor or concentrated attention on the part of the operator.

Various changes in the specific form shown and described may be made within the scope of the claims without departing from the spirit of the invention.

I claim:

1. An attachment of the kind described comprising means for coincidentally cleaning the opposite edges of a travelling strip of metal, said means being movable in a plane parallel with the surface plane of said strip and means for simultaneously cleaning one surface of said strip adjacent to said opposite edges as the strip travels along.

2. An attachment of the kind described comprising means for coincidentally cleaning the opposite edges of a travelling strip of metal and one surface thereof adjacent to said edges as the strip travels along and means for adjusting the cleaning means in accordance with the dimensions of said strip.

3. An attachment of the kind described comprising a pair of side rollers for coincidentally cleaning the opposite edges of a travelling strip of metal during its travel, said rollers rotating about axes which intersect the surface plane of said strip of metal, a pair of rotary brushes rotatable in planes transverse to said plane of the strip for simultaneously cleaning the one surface of said strip adjacent to said edges and mechanism for operating said rollers and said brushes.

4. An attachment of the kind described comprising a pair of side rollers for cleaning the opposite edges of a travelling strip of metal during its travel, a drive shaft, driven shafts carrying said rollers, co-operating gears in said drive and driven shafts for operating said rollers, means for adjusting said rollers toward and away from each other and for correspondingly adjusting the gears on said drive shaft, a pair of rotary brushes for cleaning the one surface of said strip adjacent to said edges, said brushes being adjustable toward and away from each other and means for concurrently operating said brushes and said drive shaft to actuate said side rolls.

5. An attachment of the kind described comprising a pair of side rollers for cleaning the opposite edges of a travelling strip of metal during its travel, a drive shaft, driven shafts carrying said rollers, co-operating gears on said drive and driven shafts for operating said rollers, an auxiliary shaft, a pair of rotary brushes adjustably mounted thereon for cleaning the one surface of said strip adjacent to said edges, means whereby said auxiliary shaft is adjusted to shift the brushes toward and away from the plane of travel of said strip and means for concurrently operating said drive and auxiliary shafts to actuate said side rollers and brushes..

6. An attachment of the kind described comprising a pair of side rollers for cleaning the opposite edges of a travelling strip of metal during its travel, said rollers being capable of yielding in accordance with variations in the width of said strip, a pair of rotary brushes for cleaning one surface of said strip adjacent to said edges and mechanism for operating said rollers and brushes.

7. An attachment of the kind described comprising a pair of side rollers for cleaning the opposite edges of a travelling strip of metal during its travel, a pair of rotary brushes for cleaning one surface of said strip adjacent to said edges, mechanism for operating said rollers and brushes, adjusting screws whereby said side rollers may be adjusted toward and away from each other in accordance with strips of different widths, and springs combined with said screws whereby said rollers are capable of yielding in accordance with variations in the width of a given strip.

8. An attachment of the kind described comprising a pair of side rollers for cleaning the opposite edges of a travelling strip of metal during its travel, a drive shaft, driven shafts carrying said rollers, co-operating gears on said rollers, arms pivotally mounted on said drive shaft, an auxiliary shaft journalled on said arms, a pair of rotary brushes adjustably mounted on said auxiliary shaft for cleaning one surface of said strip adjacent to said edges, a link connected with one of said arms to pivotally shift the same and adjust the position of said auxiliary shaft, means for clamping said link to lock said arms in an adjusted position, and gearing whereby said drive and auxiliary shafts are concurrently operated to actuate said side rollers and brushes.

9. An attachment of the kind described comprising a pair of side rollers for cleaning the opposite edges of a travelling strip of metal during its travel, a drive shaft, driven shafts carrying said rollers, co-operating gears on said drive and driven shafts for operating said rollers, means for adjusting said rollers toward and away from each other and for correspondingly adjusting the gears on said drive shaft, arms pivotally mounted on said drive shaft, an auxiliary shaft journalled on said arms, a pair of rotary brushes adjustably mounted on said auxiliary shaft for cleaning one surface of said strip adjacent to said edges, a link connected with one of said arms to pivotally shift the same and adjust the position of said auxiliary shaft, means for clamping said link to lock said arms in an adjusted position, and gearing whereby said drive and auxiliary shafts are concurrently operated to actuate said side rollers and brushes.

10. In an attachment of the kind described the combination of a cleaning member for cleaning an edge of a travelling strip, said member being movable relatively to said edge in a plane parallel with the direction of travel of said strip and a cleaning device movable in a plane transverse to said direction of travel for simultaneously cleaning a surface of said strip along said edge.

In testimony whereof I have hereunto set my hand.

MAXWELL H. SUSSMAN.